United States Patent
Bress et al.

(10) Patent No.: US 7,318,137 B2
(45) Date of Patent: *Jan. 8, 2008

(54) WRITE PROTECTION FOR COMPUTER LONG-TERM MEMORY DEVICES WITH MULTI-PORT SELECTIVE BLOCKING

(76) Inventors: Steven Bress, 17917 Wheatridge Dr., Germantown, MD (US) 20874; Mark Joseph Menz, 114 Rawlings Ct., Folsom, CA (US) 95630

( * ) Notice: Subject to any disclaimer, the term of this patent is extended or adjusted under 35 U.S.C. 154(b) by 567 days.

This patent is subject to a terminal disclaimer.

(21) Appl. No.: 10/765,526

(22) Filed: Jan. 27, 2004

(65) Prior Publication Data

US 2004/0186953 A1    Sep. 23, 2004

Related U.S. Application Data

(60) Provisional application No. 60/443,393, filed on Jan. 29, 2003.

(51) Int. Cl.
*G06F 12/00* (2006.01)

(52) U.S. Cl. .................. 711/163; 711/112
(58) Field of Classification Search ............... None
See application file for complete search history.

(56) References Cited

U.S. PATENT DOCUMENTS

| | | | |
|---|---|---|---|
| 6,336,187 B1 * | 1/2002 | Kern et al. | 713/161 |
| 2003/0233583 A1 * | 12/2003 | Carley | 713/201 |
| 2004/0064737 A1 * | 4/2004 | Milliken et al. | 713/201 |

* cited by examiner

*Primary Examiner*—Reginald Bragdon
*Assistant Examiner*—Ngoc Dinh

(57) ABSTRACT

The current invention is a blocking device that provides read and write protection for computer long-term storage devices, such as hard drives. The blocking device is placed between a host computer and the storage device. The blocking device intercepts communications between the host and the storage device and examines commands from the host to the storage device. Certain commands, such as commands that may modify the storage device, may be discarded. The current invention enables multiple host computers to communicate to the blocking device. The current invention selectively blocks only specified host computers.

3 Claims, 2 Drawing Sheets

WRITE PROTECTION FOR COMPUTER LONG-TERM MEMORY DEVICES WITH MULTI-PORT SELECTIVE BLOCKING

RELATED APPLICATIONS

This application claims priority under 35 U.S.C. § 119 based on U.S. Provisional Application No. 60/443,393, filed Jan. 29, 2003, the disclosure of which is incorporated herein by reference.

Our invention is an improvement of U.S. patent application Ser. No. 09/961,417, filed Apr. 4, 2002, now U.S. Pat. No. 6,813,682 the disclosure of which is incorporated herein.

BACKGROUND OF THE INVENTION

A. Field of Invention

The present invention relates to computer memory devices and, more specifically, to mechanisms for controlling user access to the memory devices.

B. Description of Related Art

There are many situations where it is desirable to allow certain users to read data from a non-volatile long-term memory storage device, such as a hard drive, but not allow any data to be written to the device and to allow certain users both to read and write data to the same long-term memory storage device. Internet web sites are hosted on long-term memory storage devices. Generally these sites encourage the general public to read data and prohibit them from writing data and thereby changing the site. The owners of these types of sites have a legitimate need to occasionally change/update the site. For example they may add a new product, change a price, and/or removing an old product.

Our previous invention Ser. No. 09/961,417 is able to adequately protect such a site from unwanted changes. However changing/updating the site requires the long-term memory storage device to be physically unplugged from our device. This involves a risk to the storage device (which is discussed in Ser. No. 09/961,417) and a trained user to have physical access to the long-term memory storage device. In addition, the site must be down while the upgrade is being performed. This is clearly unnecessarily burdensome.

Our previous invention Ser. No. 09/961,417 is able to selectively allow access to just a portion of a long-term memory storage device. There are situations, such as company Intranets, where different divisions within the company share the same long-term memory storage device. It is often desired that each division have access only to data relating to its own division, whereas corporate have access to all data. Our previous invention would not be able to accomplish this. However, our current invention does. For example; Division A may access the long-term memory device (205) through Host Port 1 (1011). The blocking device (203) is set to only allow Host Port 1 access to blocks aaaa-bbbb. In a similar fashion Division B accesses the drive (205) through Host Port 2 and is allowed access to blocks cccc-dddd. Corporate is allowed access to all data and accesses the drive (205) through Host Port n, where it is allowed full access.

Our previous invention Ser. No. 09/961,417 has only one Drive Interface Emulator (320). This could be any type of interface, such as IDE, FireWire, or USB, but each device just has one type. This device would acquire an obvious additional flexibility by having multiple types of interfaces, which our current invention allows.

SUMMARY OF THE INVENTION

Our previous invention Ser. No. 09/961,417 is substantially enhanced by the addition of multiple Host Ports.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description of the invention refers to the accompanying drawings. The same reference numbers in different drawings identify the same or similar elements. Also, the following detailed description does not limit the invention.

A blocking device is described herein that blocks certain operations, such as read or write operations, as they are transmitted to a storage device. The blocking device is physically inserted between a host computer system and the storage device and is transparent to the host and the storage device.

The storage device may be any type of long-term non-volatile memory device. For example, the storage device may be a hard disk drive or compact flash memory. In one implementation, the storage device uses an Integrated Drive Electronics (IDE) interface. An IDE interface is a well-known electronic interface that is frequently used to connect a computer's motherboard and disk drive. In IDE drives, the disk drive controller is built into the physical case of the disk drive. The IDE interface provides a relatively high level interface between the motherboard and the disk drive.

Although concepts consistent with the present invention are primarily described herein in relation to an IDE magnetic hard disk drive, these concepts may be implemented with other types of IDE media, such as flash memory with an IDE interface. Flash memories are a special type of semiconductor random access memory that retains its data after power has been removed from the system. Other types of media useable with an IDE interface include magnetic tape and optical media, such as a compact disc (CD) and a digital versatile disc (DVD). In addition to the IDE interface, concepts consistent with the invention may be applied in a straightforward manner to other types of high-level storage interfaces, such as the well-known Small Computer System Interface (SCSI) standard.

For the sake of clarity the remaining description herein will be described with reference to an IDE magnetic hard drive, although, as mentioned above, the concepts of the invention are not limited to such drives. One skilled in the art would appreciate that other modern long-term storage device interfaces share similar functionality that could be incorporated into the concepts described herein.

Figure 1:
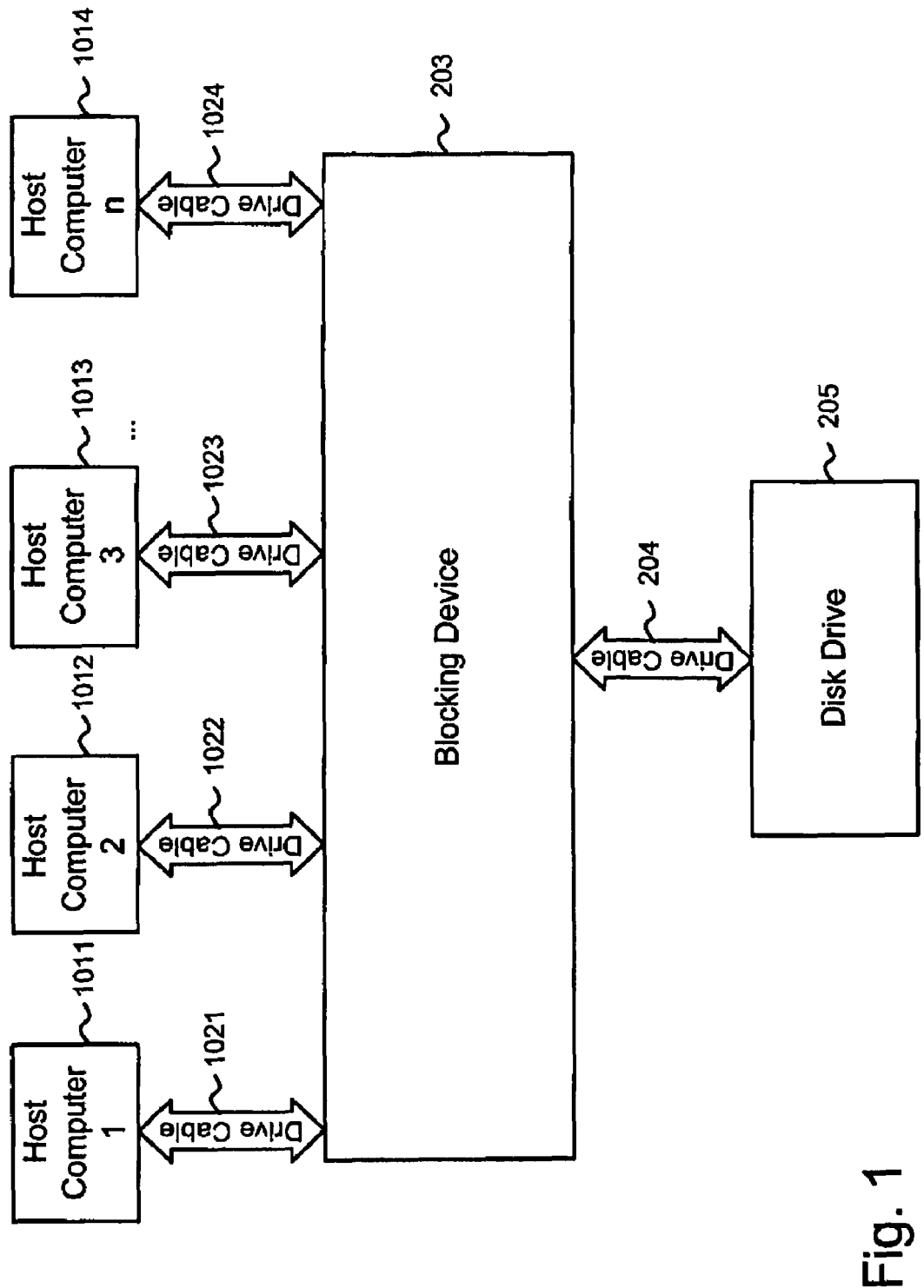
FIG. 1 is a diagram illustrating a blocking device with selective multi-port blocking consistent with concepts of the invention.

FIG. 1 is a diagram illustrating a blocking device 203 consistent with the present invention. Blocking device 203 may be a physical device inserted between a multiplicity of host computers (1011, 1012, 1013 . . . ) and a long-term storage device, such as hard disk drive 205. Host computers (1011, 1012, 1013 . . . ) may be connected to blocking device 203 through standard cables (1021, 1022, 1023 . . . ). Similarly, drive 205 may be connected to blocking device 203 through a standard cable 204.

To host computer (1011, 1012, 1013 . . . ), blocking device 203 appears to be a standard drive interface, such as an IDE drive interface, and presents to the host (1011, 1012, 1013 . . . ) the memory, registers, and control signals that a drive would normally present to host 201. To drive 205, blocking device 203 appears to be a host computer, and presents to drive 205 the memory, registers, and control signals that hosts (1011, 1012, 1013 . . . ) would normally present to drive 205. In other words, blocking device 203 is transparent to the system. This is advantageous, as blocking device 203 is therefore operating system independent and does not require software to be installed on hosts (1011, 1012, 1013). When cables (1021, 1022, 1023 . . . ) and 204 are plugged into blocking device 203, the blocking device is completely installed and ready to operate. Accordingly, installation of blocking device 203 can be performed by users that are relatively unsophisticated in the computer field.

Figure 2:
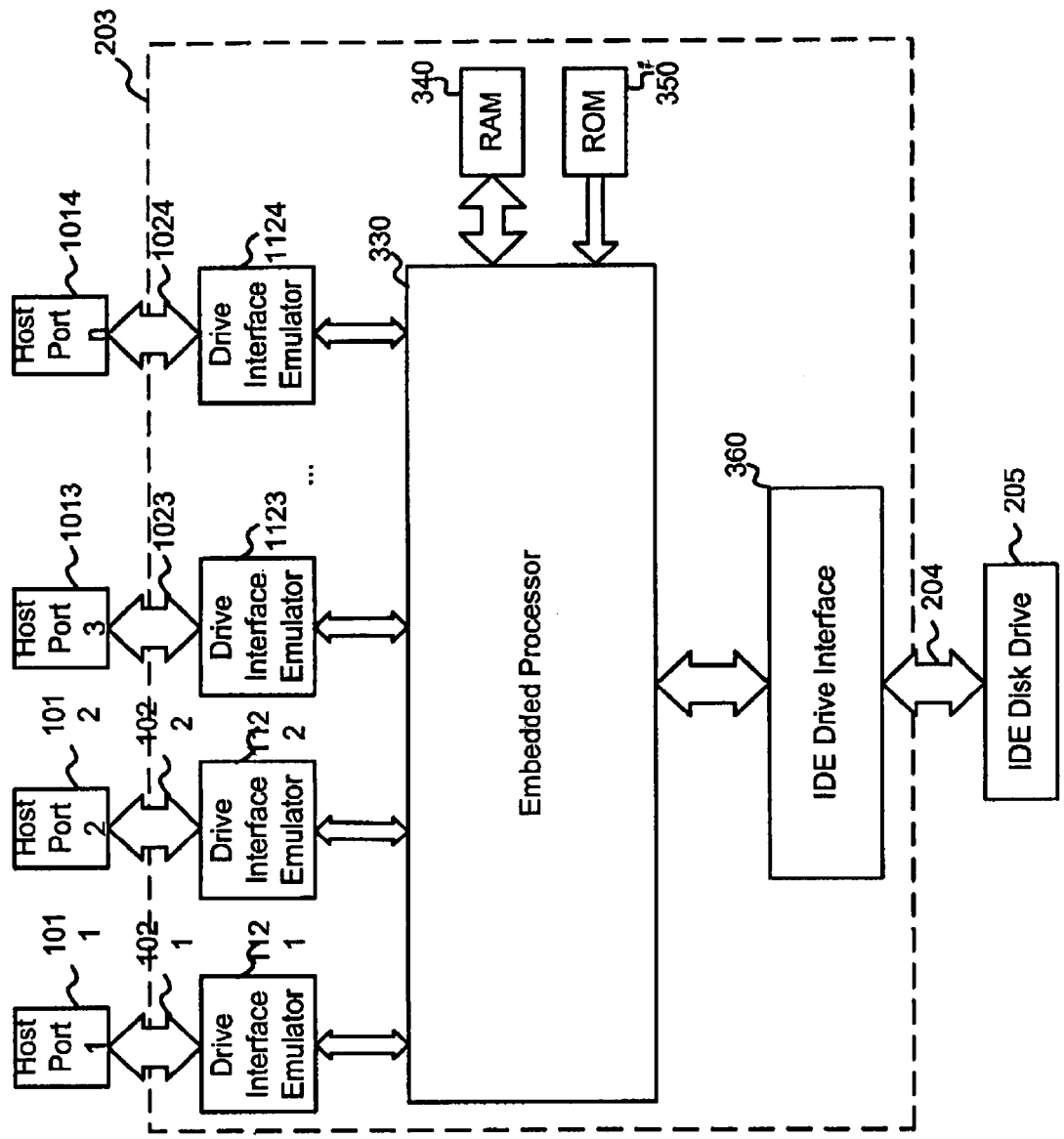
FIG. 2 is a diagram illustrating the blocking device of FIG. 1 in additional detail.

FIG. 2 is a diagram illustrating blocking device 203 in additional detail. Blocking device 203 includes three main components: drive emulators (1121, 1122, 1123), embedded processor 330, and IDE drive interface 360 when host (1011, 1012, 1013 . . . ) attempts to communicate with drive 205, the hosts (1011, 1012, 1013 . . . ) are actually communicating with a drive emulator (1121, 1122, 1123 . . . ). This drive emulator delays the communication from hosts (1011, 1012, 1013 . . . ) until embedded processor 330 has examined the communication. Embedded processor 330, based on its examination of the command from hosts (1011, 1012, 1013 . . . ), may either pass the command to IDE drive interface 360 or drop (block) the command. IDE drive interface 360 is a standard IDE drive interface that connects blocking device 203 to drive 205.

Embedded processor 330 may be additionally coupled to RAM 340 and ROM 350. RAM 340 and ROM 350 are computer readable media that may store processing instructions and data used by embedded processor 330.

In operation, if embedded processor 330 determines that a command received at a drive interface emulator (1121, 1122, 1123 . . . ) is an acceptable command to pass along to the drive, such as a read request or a capabilities request, embedded processor 330 passes the command to the registers in drive 205 through IDE drive interface 360. IDE drive interface 360 may receive any requested information back from drive 205. This received information may then pass through embedded processor 330 and drive interface emulator (1121, 1122, 1123 . . . ) before it is transmitted to hosts (1011, 1012, 1013 . . . ).

If embedded processor 330 determines that a command received through drive interface (1121, 1122, 1123 . . . ) is a write command, embedded processor 330 drops the command and, thus, does not write anything to drive 205. Blocking device 203, however, will continue to accept the correct amount of data from hosts (1011, 1012, 1013 . . . ) as specified in the write command. Embedded processor 330 may simply discard this data and may then return status information to hosts (1011, 1012, 1013 . . . ) that indicates that the write was successful. From the point of view of hosts (1011, 1012, 1013 . . . ), the data transfer will have succeeded.

Because the only data path to drive 205 goes through blocking device 203, there is no data path to the drive for even an accidental write, thereby providing absolute write protection.

One skilled in the art will realize that interfaces such as Firewire and USB do not require a drive interface emulator (1121, 1122, 1123 . . . ) but are connected directly to 330 by an appropriate port and cable. One skilled in the art will realize that Host Ports (1011, 1012, 1013 . . . ) and Cables (1021, 1022, 1023 . . . ) can be a variety of different interfaces. For example, Host Port 1 1011 can be IDE, Cable 1021 IDE, Drive Interface Emulator 1121 IDE, while Host Port 2 1012 can be Firewire, Cable 1022 Firewire (1122 not required).

SUMMARY

As described above, a blocking device is inserted between host computer systems and a storage device. The blocking device blocks certain commands, depending upon which host computer system the command is issued from, such as write commands, from being sent to the storage device. An embedded processor within the blocking device controls functionality of the blocking device. The functionality of the embedded processor can be programmably modified to allow for a number of different possible blocking options.

Although the blocking device has been primarily described as blocking write commands, one of ordinary skill in the art will appreciate that the blocking device could instead or additionally block read commands.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The foregoing description of preferred embodiments of the present invention uses the term "processor", but this term is not intended to limit the invention to a precise form. One skilled in the art will appreciate that a processor may also be described as; circuitry and logic algorithms.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

The invention claimed is:

1. A multi-port selective blocking device comprising:
    one or more interface emulators configured to emulate an interface presented by a storage device and configured to connect to a host, for the purpose of reading and writing (Write Unblocked);
    one or more interface emulators configured to emulate an interface presented by a storage device and configured to connect to a host, for the purpose of reading only (Write Blocked);

an interface for connecting to a storage device; and
a processor coupled to the interface emulators and the interface, the processor examining commands received through the interface emulator that are generated by the host and intended for the storage device, the processor allowing the storage device to receive all commands from a Write Unblocked interface emulator, the processor allowing only those commands from a Write Blocked interface emulator that are commands recognized by the processor as not modifying a storage state of the storage device, wherein
the multi-port selective blocking device is transparent to normal operation of the hosts and the storage device.

2. The blocking device of claim 1, further including:
a temporary storage device coupled to the processor, the processor storing data from a Write Blocked host corresponding to dropped commands in the temporary storage device.

3. The blocking device of claim 1, wherein when read commands are received from a Write Blocked host that refer to data stored in the temporary storage device, the processor returns the data from the temporary storage device to the host.

* * * * *